Patented Feb. 13, 1951

2,541,089

UNITED STATES PATENT OFFICE 2,541,089

PROCESS FOR PREPARING N-ALKYL-SUBSTITUTED N-BETA ALKANOLAMINES

Edward Joseph Nikawitz, Passaic, N. J., assignor to Burton T. Bush, Inc., New York, N. Y., a corporation of New Jersey No Drawing. Application December 5, 1946, Serial No. 714,135

11 Claims. (Cl. 260—570.6)

1

This invention relates to a process for preparing higher molecular N-alkyl-substituted N-beta-alkanolamines. These compounds may be represented according to their structural formula as follows:

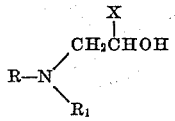

wherein R represents an alkyl radical having from 8 to 18 carbon atoms, X is H or $CH_3$, and $R_1$ may be H, an alkyl radical containing not more than 4 carbon atoms, or benzyl ($C_6H_5CH_2$—).

The substances prepared in accordance with the process of this invention are useful in commerce. They may be employed as textile softeners and insecticides.

In addition, the compounuds prepared with the aid of the instant novel process are valuable as intermediates in preparing textile agents and substances having bacteriocidal and fungicidal properties.

In spite of the uses of the substances under discussion, it is noteworthy that no simple and commercially-feasible process exists for their preparation from alkyl halides and mono-N-substituted N-beta-alkanolamines. My present invention is directed to providing just such a process.

Though higher alkyl halides and mono-N-substituted N-beta-alkanolamines in general are miscible, at least under reflux conditions, it has been found that merely reacting these materials under reflux, for example, does not result in a satisfactory process. For one thing, the reaction proceeds slowly and many hours are often necessary in order to effect a conversion into a substantial yield of the desired material. Moreover, even though a substantial conversion may have been effected by such a process, it has been found that relatively poor yields of the desired products can actually be isolated, because of difficulties involved in separating the desired products from resinous by-products formed during the reaction and/or separation steps.

My novel process enables me to obtain substantially theoretical yields of substantially pure products within short reaction periods. Resinous by-products are practically eliminated, and consequently, losses caused by their formation as well as difficulties encountered in isolating the desired products in the presence of such by-products are substantially avoided.

2

In general, my novel process involves heating higher molecular alkyl halides and suitable mono-N-substituted N-beta-alkanolamines in the presence of certain added materials. These added materials all have the property of acting as mutual solvents for the reactants. However, it is not sufficient merely to provide mutual solvents. This may be deduced from the facts that the use of isopropyl alcohol or isoamyl alcohol, to name just two mutual solvents which are unsatisfactory, results in very poor yields of the desired N-alkyl-substituted N-beta-alkanolamines within short reaction periods.

Thus far, I have not been able to ascertain, by experimentation or otherwise, what additional quality, besides that of being a mutual solvent, the added materials must possess in order to enable me to obtain excellent yields within a short reaction period. Indeed, so far as I have been able to learn, there is no way of predicting in advance whether any given mutual solvent will also possess the additional property of enabling substantially-theoretical yields of N-alkyl-substituted N-beta-alkanol amines to be obtained within reasonable reaction periods.

As added materials which have been found to give excellent yields in my process may be noted: benzyl alcohol, tetrahydrofurfuryl alcohol, the mono-methyl ether of diethylene glycol, the mono-ethyl ether of diethylene glycol, phenyl ethyl alcohol, lower alkyl ring-substituted ($C_1$ to $C_4$) benzyl alcohols, beta-hydroxyethyl phenyl ether, mono-butyl ether of diethylene glycol, mono ethyl butyl ether of ethylene glycol, and mono-butyl ether of ethylene glycol.

The alkyl halides I contemplate using in accordance with my invention are those wherein the alkyl radicals thereof contain from eight to eighteen carbon atoms. Thus, for example, are included octyl bromide, lauryl chloride, myristyl bromide, octadecyl chloride, and mixtures of two or more of these as well as other alkylhalides having eight to eighteen carbon atoms. It is also understood that my invention contemplates the use of alkyl iodides and fluorides, and is therefore not to be restricted to the bromides and chlorides.

In carrying out my process, it has been found that considerable latitude is permissible with regard to ratio of the materials charged into the reaction chamber. Thus, equimolecular amounts of the alkyl halide and substituted N-beta-alkanolamine with a minor amount of the added material may be employed. In such case, an equivalent amount of a tertiary amine, such as dimethylaniline, or other hydrogen halide fixing material, should be employed. Excellent results, however, have been obtained where 1 mol of the alkyl halide and 2 mols of N-substituted N-beta-alkanolamine have been used, the second mol of the amine acting as the hydrogen halide fixing agent. Obviously, if desired, more than the amount of added material just sufficient to insure solution may be employed.

The mono - N - substituted N - beta - alkanolamines which may be used in my process are those having the formula,

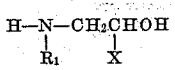

wherein X is C or CH₃, and R₁ may be H, an alkyl radical containing not more than 4 carbon atoms, or the benzyl (C₆H₅CH₂—) radical.

The temperature at which my process may be effected may vary, depending on the materials treated, inter alia. It is preferred to conduct the reaction under reflux conditions, at atmospheric pressure, but, if desired, the reaction may also be conducted at elevated temperatures lower than reflux temperatures. In general, however, the higher the temperature the quicker a satisfactory yield of the desired product is obtained. Consequently, the reaction may even be conducted under super-atmospheric pressure, at temperatures above normal boiling temperatures, if desired.

As will be understood by organic chemists, the time of the reaction, or reaction period, may be varied. The end point is normally when a substantially theoretical yield has been obtained, but, if desired, the reaction may be stopped before this point is reached. The temperature and pressure under which the reaction is conducted and the concentration of the starting materials are some other factors which govern the length of the reaction periods.

In specific cases I have found that the reaction is usually substantially complete in five minutes, but in most cases reaction periods from about one to fifteen minutes are found desirable.

As a practical matter, the extent of reaction may be followed by measuring the amount of ionized halogen found according to known methods. From the information obtained, the extent of reaction can be determined, also in known manner.

I order to more fully illustrate my novel process I am setting forth the following specific examples, which, however, are not intended to be construed as limiting the invention.

EXAMPLE I

*Preparation of N-lauryl-N-beta-ethanolamine*

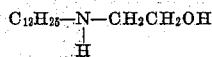

41.0 grams of lauryl chloride having a boiling point of 128°–130° C. at 11 mm. Hg pressure, 48.8 grams of N-beta-mono-ethanolamine, and 74 cc. of benzyl alcohol were refluxed under atmospheric pressure for ten minutes. After cooling down to 100° C., 8 grams of sodium hydroxide in 10 cc. of water, and 100 cc. of isopropyl alcohol were added. The contents were heated under reflux for ten minutes.

The solution, after standing at room temperature (about 25° C.) over night, was filtered off from the salt. The salt cake was washed twice with 20 cc. of isopropyl alcohol each time. The wash was added to the previous filtrate. The isopropyl alcohol was then distilled from the combined solutions under low vacuum.

The residue in the distilling flask was distilled under a pressure of 5 mm. of mercury. A fraction, boiling between 75°–95° C. and consisting mainly of benzyl alcohol and N-beta-mono-ethanolamine, was first obtained. Then a fraction (38.0 grams) boiling at 165°–225° C., which on redistillation gave 35.5 grams of substantially pure lauryl mono-ethanolamine boiling at 165°–175° C. at 5 mm. Hg. pressure, was obtained.

The N-lauryl N-beta-mono-ethanolamine was soluble in dilute mineral acids and has a melting point of 44.2° C. and a congealing point of 43.0° C. It may be employed as a textile agent. It can also be converted into quaternary ammonium compounds having germicidal properties.

EXAMPLE II

*Preparation of N-lauryl N-beta-mono-ethanolamine*

Substantially the same results as those of Example I are obtained if a chemically-equivalent amount of lauryl bromide (boiling point 175°–180° C. at 45 mm. Hg pressure) is used in place of lauryl chloride, and the procedure of Example I is followed.

EXAMPLE III

*Preparation of N-lauryl N-benzyl-N-beta-ethanolamine*

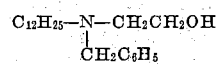

41 grams of lauryl chloride, 61 grams of N-benzyl-N-beta-ethanolamine and 50 cc. of benzyl alcohol are refluxed for ten minutes under atmospheric conditions. After cooling to 100° C., 8 grams of sodium hydroxide in 10 cc. of water and 150 cc. of #30 alcohol were added, and the contents were refluxed for five minutes.

The salt which formed was filtered and washed with 20 cc. of #30 alcohol, the wash alcohol being then added to the filtrate from the salt filtration step. The alcohol was then distilled from the combined solution.

The residue remaining after removal of the alcohol was distilled under high vacuum. A fraction, boiling between 86°–185° C. at 5 mm. Hg pressure and consisting mainly of benzyl alcohol and N-benzyl N-beta-ethanolamine, was obtained. Then a fraction (56 grams) boiling at 189°–240° C. at 5 mm. Hg pressure which on redistillation gave 47.0 grams of N-lauryl N-benzyl N-beta-ethanolamine boiling at 205°–225° C. 5 mm. Hg, was obtained.

N-lauryl-N-benzyl-N-beta-ethanolamine is a brown colored oil which congeals at room temperature to mushy crystals. It is difficultly soluble in dilute mineral acids but forms a soluble quaternary compound with dimethyl sulfate. It may be used as a textile agent, or it can be converted into quaternary ammonium compounds having germicidal properties.

EXAMPLE IV

*Preparation of N-lauryl N-benzyl N-beta-ethanolamine*

Substantially the same results as those of Example III are obtained if 50 cc. of tetrahydro furfuryl alcohol are used in place of the 50 cc. of benzyl alcohol employed in Example III.

EXAMPLE V

*Preparation of N-lauryl-N-butyl-N-beta-ethanolamine*

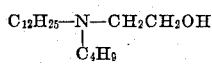

41.0 grams of lauryl chloride, 47.0 grams of N-butyl-N-beta-ethanolamine, and 50 cc. of benzyl alcohol are refluxed for five minutes under atmospheric conditions. After cooling to 100° C., 8 grams of sodium hydroxide in 10 cc. of water and 100 cc. of isopropyl alcohol are added. The contents were refluxed for five minutes.

The solution, after standing at room temperature (about 25° C.) over night, was filtered off from the salt. The salt cake was washed twice, with 20 cc. of isopropyl alcohol each time. The wash was added to the previous filtrate. The isopropyl alcohol was then distilled from the combined solutions under low vacuum.

The residue was distilled under high vacuum (5 mm. Hg pressure). A fraction, boiling between 80°–160° C. at 5 mm. Hg pressure and consisting mainly of benzyl alcohol and N-butyl-N-beta-ethanolamine was obtained. Then a fraction (47 grams) boiling between 176°–200° C. at 5 mm. Hg pressure was obtained. This is substantially pure lauryl butyl ethanolamine, having an index of refraction, at 25° C., of 1.4557. It is a slightly colored thick oil and may be employed as a textile agent or converted into germicidal quaternary ammonium compounds.

EXAMPLE VI

*Preparation of N-lauryl N-butyl-N-beta-ethanolamine*

Substantially the same results as those of Example V were obtained by using 50 cc. of monomethyl ether of diethylene glycol in place of the 50 cc. of benzyl alcohol, and following the procedure of Example V.

EXAMPLE VII

*Preparation of a mixture of N-alkyl-N-beta-ethanolamines having 8, 12, 14, 16 and 18 carbon atoms in the carbon chain*

102.4 grams of a mixture having a boiling range of 105°–170° C. at a pressure of 5 mm. of mercury and consisting of about 60% lauryl chloride and 10% each of octyl chloride, myristyl chloride, stearyl chloride and octadecyl chloride, and 122 grams of N-beta-ethanolamine were refluxed for ten minutes under atmospheric pressure in the presence of 150 cc. of mono-methyl ether of diethylene glycol.

There was then added a solution of 20 grams of sodium hydroxide in 20 cc. of water and then 100 cc. of isopropyl alcohol. The contents were refluxed for twenty minutes.

After standing over night, the salt which had formed was filtered off, and washed with 20 cc. of isopropyl alcohol, the alcohol being added to the filtrate from the salt filtration step. The isopropyl alcohol was then distilled from the combined solution.

The residue remaining after removal of the alcohol was distilled under high vacuum. Fractions containing substantially all the monomethyl ether of diethylene glycol were obtained. When the distillation had been carried to the point where the temperature of the vapors in the distilling flask reached 150° C. at 4 mm. Hg pressure, the residue still remaining in the flask consisted essentially of a mixture of alkyl ethanolamines. This residue, upon distillation gave 87 grams of a brown, oily wax. This distillate may be employed per se as a textile agent or it may be converted into quaternary ammonium compounds and used as germicides.

EXAMPLE VIII

*Preparation of N-octyl N-ethyl N-beta ethanolamine*

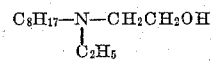

29 grams of octyl bromide, 18 grams of N-ethyl N-beta ethanolamine, and 40 cc. of benzyl alcohol were refluxed under atmospheric pressure for ten minutes. After cooling the contents to 100° C., 6 grams of sodium hydroxide in 10 cc. of water were added, followed by the addition of 50 cc. of ethyl alcohol.

The contents were refluxed for three minutes and then the ethyl alcohol was removed by distillation. The salt was filtered off and washed with 10 cc. of benzyl alcohol, the wash liquid being united with the main liquid part.

The liquid was distilled under a pressure of 4 mm. of mercury. A fraction boiling between 60°–110° C. and consisting of essentially benzyl alcohol and N-ethyl-N-beta-ethanolamine was recovered. Then followed a fraction of 24 grams, consisting of the desired N-octyl-N-ethyl-N-beta-ethanolamine, boiling at 123°–125° C. and having an index refraction of (20° C.) of 1.4531. It is a colorless oil, soluble in dilute mineral acids. Its salts with quaternizing agents such as methyl iodide are surface active agents.

EXAMPLE IX

*Preparation of N-octadecyl N-ethyl N-beta-ethanolamine*

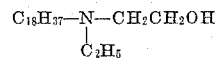

The procedure of the preceding example was followed using in place of the three materials originally treated under reflux therein the following:

14.4 grams of octadecyl chloride,
8.9 grams of N-ethyl-beta-ethanolamine,
20.0 cc. of benzyl alcohol.

The fractions obtained after removal under high vacuum of benzyl alcohol and N-ethyl-N-beta-ethanolamine, consisted of 14.2 grams of a white wax, having a congealing point of 27° C., and a melting point of 23° C. This fraction which boiled at 210°–220° C., was the desired N-octadecyl-N-ethyl-N-beta-ethanolamine.

EXAMPLE X

*Preparation of N-lauryl N-beta-mono-isopropanolamine*

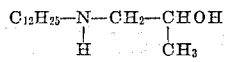

20.5 grams of lauryl chloride, 35.0 grams of N-beta-isopropanolamine and 40 cc. of benzyl alcohol were refluxed under atmospheric pressure for fifteen minutes. After cooling the contents to 100° C., 4 grams of sodium hydroxide in 10 cc. of water were added, followed by 50 cc. of ethyl alcohol.

The contents were refluxed for five minutes and then cooled to room temperature (25° C.). The salt was filtered off and washed with 10 cc. of ethyl alcohol, the wash liquid being united with the main liquid part. After removing the ethyl alcohol by distillation under atmospheric pressure, the residue was distilled under a pressure of 6 mm. of mercury. A fraction (65 grams) boiling between 60°–100° C. and consisting essentially of benzyl alcohol and N-beta-mono-isopropanolamine was obtained, followed by 24 grams of the desired material, N-lauryl-N-beta-mono-isopropanolamine, as a light colored wax easily soluble in dilute mineral acids. Upon distillation of this wax 21 grams of a white, waxy substance were obtained. This distilled at 170°–180° C. at 5 mm. mercury pressure, had a congealing point of 57° C., a melting point of 58° C., and its salts with quaternizing agents such as methyl iodide are surface active agents.

In the foregoing examples, substantially the same results were obtained by substituting octyl and lauryl bromides in place of the corresponding chlorides.

The foregoing illustrates the practice of this invention, which however, is not to be limited thereby, but is to be construed as broadly as permissible in view of the prior art and limited solely by the appended claims.

I claim:

1. The process for preparing compounds having the formula,

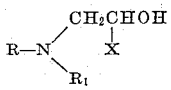

wherein R is an alkyl group having 8 to 18 carbon atoms, X is a member selected from the group consisting of H and CH₃, and R₁ is a member selected from the group consisting of H, an alkyl radical containing not more than 4 carbon atoms, and a benzyl (C₆H₅CH₂—) radical, which comprises heating a substance having the formula, R halogen, together with a substance having the formula,

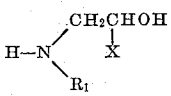

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ethers, mono-butyl ether of diethylene glycol, mono-ethyl-butyl ether of ethylene glycol, and mono-butyl ether of ethylene glycol.

2. The process for preparing compounds having the formula,

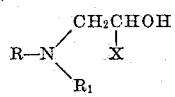

wherein R is an alkyl group having 8 to 18 carbon atoms, X is a member selected from the group consisting of H and CH₃, and R₁ is a member selected from the group consisting of H, an alkyl radical containing not more than 4 carbon atoms, and a benzyl (C₆H₅CH₂—) radical, which comprises heating under a reflux at atmospheric pressure a substance having the formula, R halogen, together with a substance having the formula,

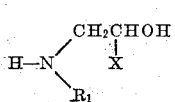

in the presence of a material selected from the group consisting of benzyl alcohol, tetrahydrofurfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ethers, mono-butyl ether of diethylene glycol, mono-ethyl-butyl ether of ethylene glycol, and mono-butyl ether of ethylene glycol.

3. The process for preparing compounds having the formula,

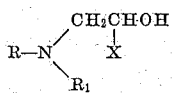

wherein R is an alkyl group having 8 to 18 carbon atoms, X is a member selected from the group consisting of H and CH₃, and R₁ is a member selected from the group consisting of H, an alkyl radical containing not more than 4 carbon atoms, and a benzyl (C₆H₅CH₂—) radical, which comprises heating under reflux at atmospheric pressure a substance having the formula, R Cl, together with a substance having the formula,

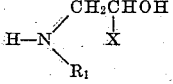

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ethers, mono-butyl ether of diethylene glycol, mono-ethyl-butyl ether of ethylene glycol, and mono-butyl ether of ethylene glycol.

4. The process for preparing compounds having the formula,

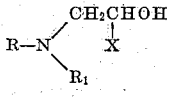

wherein R is an alkyl group having 8 to 18 carbon atoms, X is a member selected from the group consisting of H and CH₃, and R₁ is a member selected from the group consisting of H, an alkyl radical containing not more than 4 carbon atoms, and a benzyl (C₆H₅CH₂—) radical, which comprises heating under reflux at atmospheric pressure a substance having the formula, RBr, together with a substance having the formula,

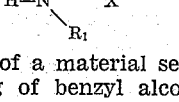

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ethers, mono-butyl ether of diethylene glycol, mono-ethyl-butyl ether of ethylene glycol, and mono-butyl ether of ethylene glycol.

5. The process for preparing compounds having the formula,

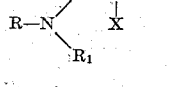

wherein R is an alkyl group having 8 to 18 carbon atoms, X is a member selected from the group consisting of H and CH₃, and R₁ is a member selected from the group consisting of H, an alkyl radical containing not more than 4 carbon atoms, and a benzyl (C6H5CH2—) radical, which comprises heating under reflux at atmospheric pressure about a mol of a substance having the formula, R halogen, together with about 2 mols of a substance having the formula,

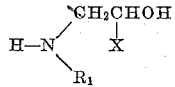

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ethers, mono-butyl ether of diethylene glycol, mono-ethyl-butyl ether of ethylene glycol, and mono-butyl ether of ethylene glycol.

6. The process for preparing compounds having the formula,

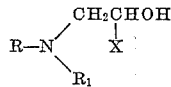

wherein R is an alkyl group having 8 to 18 carbon atoms, X is a member selected from the group consisting of H and CH3, and R1 is a member selected from the group consisting of H, an alkyl radical containing not more than 4 carbon atoms, and a benzyl (C6H5CH2—) radical, which comprises heating under reflux at atmospheric pressure about a mol of a substance having the formula, R halogen, together with about 2 mols of a substance having the formula,

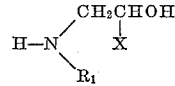

in the presence of benzyl alcohol.

7. The process for preparing compounds having the formula,

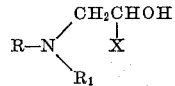

wherein R is an alkyl group having 8 to 18 carbon atoms, X is a member selected from the group consisting of H, and CH3, and R1 is a member selected from the group consisting of H, an alkyl radical containing not more than 4 carbon atoms, and a benzyl (C6H5CH2—) radical, which comprises heating under reflux at atmospheric pressure about a mol of a substance having the formula, R halogen, together with about 2 mols of a substance having the formula,

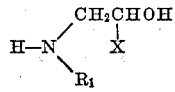

in the presence of tetrahydro furfuryl alcohol.

8. The process for preparing compounds having the formula,

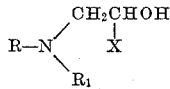

wherein R is an alkyl group having 8 to 18 carbon atoms, X is a member selected from the group consisting of H and CH3, and R1 is a member selected from the group consisting of H, an alkyl radical containing not more than 4 carbon atoms, and a benzyl (C6H5CH2—) radical, which comprises heating under reflux at atmospheric pressure about a mol of a substance having the formula, R halogen, together with about two mols of a substance having the formula,

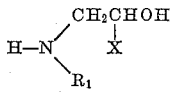

in the presence of the mono-methyl ether of diethylene glycol.

9. The process for preparing N-lauryl N-beta-mono-ethanolamine, which comprises heating under reflux at atmospheric pressure about 1 mol of lauryl chloride with about 2 mols of N-beta-mono-ethanolamine in the presence of benzyl alcohol.

10. The process for preparing N-lauryl N-benzyl N-beta-ethanolamine, which comprises heating under reflux at atmospheric pressure about 1 mol of lauryl chloride with about 2 mols of N-benzyl N-beta-ethanolamine in the presence of benzyl alcohol.

11. The process for preparing N-lauryl N-butyl N-beta-ethanolamine, which comprises heating under reflux at atmospheric pressure about 1 mol of lauryl chloride with about 2 mols of N-butyl N-beta-ethanolamine in the presence of benzyl alcohol.

EDWARD JOSEPH NIKAWITZ.

REFERENCES CITED

The following references are of record in the file of this patent:

UNITED STATES PATENTS

| Number | Name | Date |
|---|---|---|
| 1,836,047 | Somerville | Dec. 15, 1931 |
| 1,836,048 | Somerville | Dec. 15, 1931 |

OTHER REFERENCES

Wedekind: "Ann." 471, pages 73–112 (1929).
Pierce et al.: "J. Am. Chem. Soc." 64, pages 1691–1694 (1942).
Rumpf et al.: "Bull. Soc. Chim." 10, pages 347–349 (1943).